United States Patent
Kawanishi et al.

(10) Patent No.: US 7,358,993 B2
(45) Date of Patent: Apr. 15, 2008

(54) DIGITAL STILL CAMERA APPARATUS, VIDEO CAMERA APPARATUS, AND INFORMATION TERMINAL APPARATUS

(75) Inventors: Isao Kawanishi, Kanagawa (JP); Ken Nakajima, Tokyo (JP)

(73) Assignee: Sony Corporation, Tokyo (JP)

( * ) Notice: Subject to any disclaimer, the term of this patent is extended or adjusted under 35 U.S.C. 154(b) by 351 days.

(21) Appl. No.: 10/517,025

(22) PCT Filed: Jun. 9, 2003

(86) PCT No.: PCT/JP03/07285
§ 371 (c)(1), (2), (4) Date: Jul. 5, 2005

(87) PCT Pub. No.: WO03/105467
PCT Pub. Date: Dec. 18, 2003

(65) Prior Publication Data
US 2005/0264661 A1    Dec. 1, 2005

(30) Foreign Application Priority Data
Jun. 10, 2002    (JP)    ............... 2002-169010

(51) Int. Cl.
*H04N 9/64*    (2006.01)

(52) U.S. Cl. ...................... 348/248; 348/241

(58) Field of Classification Search ............... 348/241, 348/248, 362, 250, 249, 247, 243
See application file for complete search history.

(56) References Cited

U.S. PATENT DOCUMENTS 6,618,090 B1 *    9/2003    Kidono et al. ............... 348/362
7,167,204 B2 *    1/2007    Kidono et al. ............... 348/364

FOREIGN PATENT DOCUMENTS

JP    2002-305689    10/2002

* cited by examiner

*Primary Examiner*—Lin Ye
*Assistant Examiner*—Amy Hsu
(74) *Attorney, Agent, or Firm*—Frommer Lawrence & Haug LLP; William S. Frommer (57) ABSTRACT

Automatic exposure adjustment control that is not affected by smear. An image pick-up device control system of an electronic shutter, a lens aperture and an automatic gain control. Smear amount is calculated precisely even if weak smear phenomenon does not reach a saturation level. When smear is detected, a first electronic shutter speed and a first lens aperture value are measured and first color information integral values of red, green and blue are measured in a predetermined color measurement area of an effective pixel region of an image pick-up unit. The electronic shutter speed is slowed to a predetermined amount to provide the same exposure as the exposure at the first electronic shutter speed and first lens aperture, and the lens aperture is narrowed only to that amount to measure the second color information integral values of the red, green and blue in the color measurement area. The smear amount is calculated from the color integral values of the red, green and blue.

15 Claims, 4 Drawing Sheets

Shutter Speed: 1/500 (sec)
F Value: 5.6
Smear x

Shutter Speed: 1/1000 (sec)
F Value: 4.0
Smear 2x $(R-x) : (G-x) : (B-x)$
$= (R'-2x) : (G'-2x) : (B'-2x)$

Shutter Speed: 1/500 (sec)
F Value: 5.6

Shutter Speed: 1/250 (sec)
F Value: 8.0

$$(R-x) : (G-x) : (B-x)$$
$$= (R'-2x) : (G'-2x) : (B'-2x)$$

$$\cdots\cdots (\beta)$$

DIGITAL STILL CAMERA APPARATUS, VIDEO CAMERA APPARATUS, AND INFORMATION TERMINAL APPARATUS

TECHNICAL FIELD

The present invention relates to a digital still camera apparatus, a video camera apparatus and an information terminal apparatus which includes the digital still camera.

BACKGROUND ART

When an image of the sun, a fluorescent light or other highly bright subjects is picked up by a digital still camera apparatus in which a solid state image sensor such as a CCD (Charge Coupled Device) is used, a bright line in strip-shape appears in the vertical direction on the picture screen. This is called the smear phenomenon. The smear phenomenon is caused such that when electric-charge generated in each photo diode (photo-electric conversion element) of the surface image pick-up device is transferred by the vertical transfer line and is read out, the electric-charge of a portion where the amount of incident light is large overflows into the vertical transfer line or the electric-charge is generated in the vertical transfer line by directly illuminating the vertical transfer line with the incident light.

In an image pick-up device control system of an electronic shutter, automatic exposure adjustment and AGC of a digital still camera, since the electric-charge generated by the smear is not contained in the electric-charge of original incident light (effective signal component), the smear is identified as a bright subject by an automatic exposure (AE) adjustment control, which causes a problem of shortage of exposure. Further, since the smear is generated regardless of a color balance of the subject by an automatic white balance (AWB) control, a color balance arithmetic error occurs and a problem of deteriorating an automatic white balance is caused depending on the smear amount. Therefore, removal of the smear data from the output data of the CCD has been attempted in order to increase the precision of the automatic exposure adjustment control and of the automatic white balance control. Conventionally, a method to obtain the smear amount from the output level of vertical OP (optical black) which is a shaded pixel region outside the effective pixel region is performed.

In a camera signal processing system, the smear phenomenon makes the quality of the camera picture signal deteriorated, and as a result, a strip-shaped line appears in the vertical direction on the screen in a monitor, which is greatly unpleasant to the eyes. Accordingly, it is necessary to remove the smear data from the output data of the CCD. Conventionally, the method to obtain the smear amount from the output level of vertical OP (optical black) which is the shaded pixel region outside the effective pixel region has been performed.

However, when the smear amount is found from the output level of vertical OP which is the shaded pixel region outside the effective pixel region, a change in dark electric-current of vertical OP, the behavior of dark noise and a defective pixel of vertical OP must be taken into consideration, for which countermeasures are difficult to be taken. Further, a circuit configuration needs to be enlarged to solve the above problems, which causes another problem of increasing the electric power consumption. Moreover, it is also difficult to detect precisely the occurrence of weak smear phenomenon which does not reach a saturation level.

DISCLOSURE OF THE INVENTION

In view of the above, the present invention aims to provide a digital still camera apparatus, in which in the image pick-up device system of an electronic shutter, automatic exposure adjustment and AGC of a digital still camera a smear amount can be calculated precisely even if a weak smear phenomenon which does not reach a saturation level occurs, without performing countermeasures against a change in the dark electric-current of vertical optical black, the behavior of the dark noise and defective pixels of vertical optical black, and an automatic exposure adjustment control and an automatic white balance control are not affected by the smear; a video camera apparatus including the digital still camera; and an information terminal apparatus including the digital still camera.

Further, the present invention aims to provide a digital still camera apparatus, in which in a camera signal processing system a smear amount can be calculated precisely and the smear component contained in a camera picture signal can be reduced even if a weak smear phenomenon which does not reach a saturation level occurs, without performing countermeasures against a change in the dark electric-current of vertical optical black, the behavior of the dark noise and defective pixels of vertical optical black; a video camera apparatus including the digital still camera; and an information terminal apparatus including the digital still camera.

The first aspect of the present invention is a digital still camera apparatus including: an image pick-up means; an electronic shutter; a lens aperture means; a smear detection means which detects a smear of a signal from the image pick-up means; an electronic shutter speed measurement and control means with respect to the electronic shutter; a lens aperture value measurement and control means with respect to the lens aperture means; an automatic exposure adjustment control means which controls the electronic shutter speed measurement and control means and the lens aperture value measurement and control means; an automatic gain control means which automatically controls a gain of the image signal from said image pick-up means; a first color information integral value measurement means which measures a first color information integral values of red, green and blue respectively in a predetermined color measurement area of an effective pixel region of the image pick-up means under the condition that the automatic exposure adjustment control means is fixed, with measuring a first electronic shutter speed of the electronic shutter and a first lens aperture value of the lens aperture means by the electric shutter speed measurement and control means and the lens aperture value measurement and control means when a smear is detected by the smear detection means; a second color information integral measurement means which measures a second color information integral values of red, green and blue respectively in the color measurement area under the condition that the automatic exposure adjustment control means is fixed, making the electronic shutter speed of the electronic shutter increase to a predetermined amount by the electronic shutter speed measurement and control means to obtain the same exposure amount as the exposure amount of the first electronic shutter speed and the first lens aperture value, so that the lens aperture of the lens aperture means is widened to that extent by the lens aperture value measurement and control means under the condition that the gain of the automatic gain control means is fixed; and a smear amount calculation means which calculates a smear amount using the first and second color information integral values of the red, green and blue from the first and second color information integral value measurement means.

According to the first aspect of the present invention, with the image pick-up means and the first color information integral value measurement means, the first electronic shutter speed of the electronic shutter and the first lens aperture value of the lens aperture means are measured by the electronic shutter speed measurement and control means and the lens aperture measurement and control means when the smear has been detected by the smear detection means, and under the condition that the automatic exposure means is fixed the first color information integral values of red, green and blue are measured in a predetermined measurement area of the effective pixel region of the image pick-up means; with the second color information integral value measurement means, the electronic shutter speed of the electronic shutter increases to a predetermined amount by the electronic shutter speed measurement and control means to become the same exposure amount as that of the first electronic shutter speed and the first lens aperture value under the condition that the gain of the automatic gain control means is fixed, with the lens aperture of the lens aperture means being widened with only that amount by the lens aperture value measurement and control means, and the second color information integral values of red, green and blue are measured respectively in the color measurement area of the effective pixel region under the condition that the automatic exposure adjustment control means is fixed; and a smear amount is calculated by the smear amount calculation means using the first and second color information integral values of the red, green and blue from the first and second color information integral value measurement means.

The second aspect of the present invention is a video camera apparatus including the digital still camera having the same configuration as the first aspect of the present invention.

The third aspect of the present invention is an information terminal apparatus including the digital still camera having the same configuration as the first aspect of the present invention.

The fourth aspect of the present invention is a digital still camera apparatus according to the first aspect of the present invention, in which both of the measurement and control means automatically adjust the exposure by subtracting the smear amount calculated by the smear amount calculation means from the integral value in the automatic exposure adjustment condition, and automatically adjust the white balance by subtracting the smear amount calculated by the smear amount calculation means from the integral value of the amount of automatic white balance adjustment.

The fifth aspect of the present invention is a video camera apparatus including the digital still camera having the same configuration as the fourth aspect of the present invention.

The sixth aspect of the present invention is an information terminal apparatus including the digital still camera having the same configuration as the fourth aspect of the present invention.

The above first to sixth aspects of the present invention relate to the image pick-up device control system of the electronic shutter, automatic exposure adjustment and AGC of the digital still camera.

The seventh aspect of the present invention is a digital still camera apparatus including: an image pick-up means; an electronic shutter; a lens aperture means; a smear detection means which detects a smear of a signal from the image pick-up means; an electronic shutter speed measurement and control means with respect to the electronic shutter; a lens aperture value measurement and control means with respect to the lens aperture means; an automatic exposure adjustment control means which controls the electronic shutter speed measurement and control means and the lens aperture value measurement and control means; an automatic gain control means which controls a gain of the image signal from said image pick-up means automatically; a first color information integral value measurement means which measures a first color information integral values of red, green and blue respectively in a predetermined color measurement area of an effective pixel region of the image pick-up means under the condition that the automatic exposure adjustment control means is fixed, with measuring a first electronic shutter speed of the electronic shutter and a first lens aperture value of the lens aperture means by the electric shutter speed measurement and control means and the lens aperture value measurement and control means when a smear is detected by the smear detection means; a second color information integral measurement means which measures a second color information integral values of red, green and blue respectively in the color measurement area under the condition that the automatic exposure adjustment control means is fixed, making the electronic shutter speed of the electronic shutter decrease to a predetermined amount by the electronic shutter speed measurement and control means to obtain the same exposure amount as that of the first electronic shutter speed and the first lens aperture value under the condition that the gain of the automatic gain control means is fixed, so that the lens aperture of the lens aperture means is narrowed to that extent by the lens aperture value measurement and control means; and a smear amount calculation means which calculates a smear amount using the first and second color information integral values of the red, green and blue from the first and second color information integral value measurement means.

The eighth aspect of the present invention is a video camera apparatus including the digital still camera having the same configuration as the seventh aspect of the present invention.

The ninth aspect of the present invention is an information terminal apparatus including the digital still camera having the same configuration as the seventh aspect of the present invention.

The above seventh to ninth aspects of the present invention relate to the camera signal processing system.

The tenth aspect of the present invention is the digital still camera apparatus according to the seventh aspect of the present invention, in which the electronic shutter speed measurement and control means makes the electronic shutter speed of the electronic shutter slow to a predetermined amount with the same exposure amount until the smear amount calculated by the smear amount calculation means becomes small, the lens aperture value measurement and control means makes the lens aperture of the lens aperture means narrow to that amount, and those operations are repeated.

The eleventh aspect of the present invention is a video camera apparatus including the digital still camera having the same configuration as the tenth aspect of the present invention.

The twelfth aspect of the present invention is an information terminal apparatus including the digital still camera having the same configuration as the tenth aspect of the present invention.

The thirteenth aspect of the present invention is the digital still camera apparatus according to the first aspect of the present invention, in which both of the measurement and control means include a multi-division color measurement means and a smear detection area specifying means which specifies a smear detection area where the calculation of the smear amount by the smear amount calculation means is performed in each area in the multi-division color measurement.

The fourteenth aspect of the present invention is a video camera apparatus including the digital still camera having the same configuration as the thirteenth aspect of the present invention.

The fifteenth aspect of the present invention is an information terminal apparatus including the digital still camera having the same configuration as the thirteenth aspect of the present invention.

BEST MODE FOR CARRYING OUT THE INVENTION

An embodiment of the digital still camera apparatus of the present invention is hereinafter explained in detail referring to the drawings.

Figure 1:
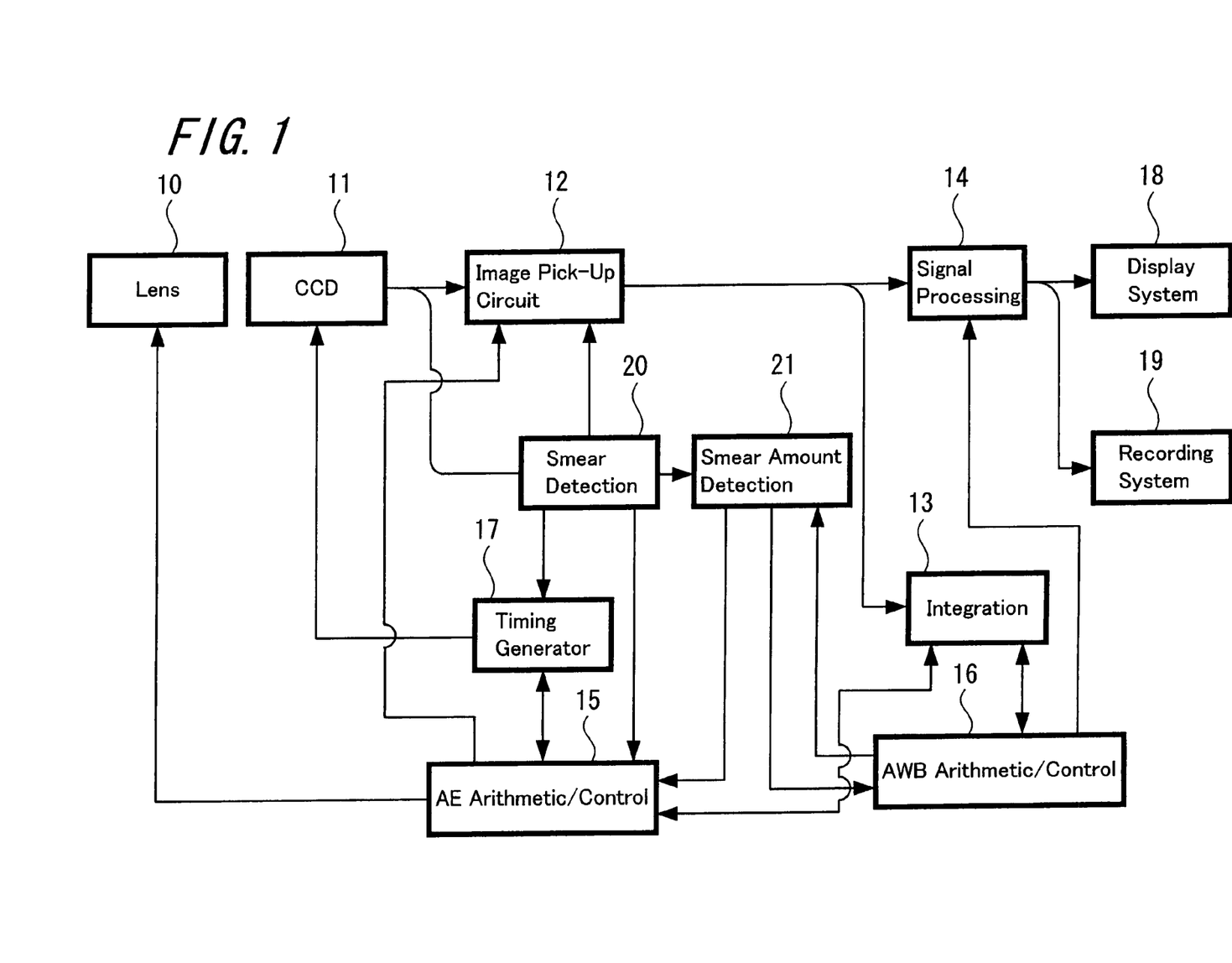
FIG. 1 is a block diagram showing an example of a digital still camera apparatus according to an embodiment of the present invention.

First, the whole configuration of a digital still camera device is explained referring to FIG. 1. Numeral 11 denotes a solid state image sensor as an image pick-up means (imager), and here a CCD (Charge Coupled Device) is used. Numeral 10 denotes an image pick-up lens. An image signal from the CCD 11 is supplied to an image pick-up circuit 12. The image pick-up circuit 12 includes a CDS (Correlated Double Sampling) circuit, an AGC (Automatic Gain Control) circuit, an A/D converter and others. An output signal from the image pick-up circuit 12 is supplied to a signal processing circuit 14. Then, the CCD 11, the image pick-up circuit 12 and the signal processing circuit 14 constitute an image pick-up system.

The image signal from the CCD 11 is supplied to a smear detection circuit 20 where the smear is detected, and a smear detected signal from the smear detection circuit 20 is supplied to a smear amount calculation circuit 21 and a smear amount is calculated. The smear detected signal from the smear detection circuit 20 is supplied to a timing generator 17 and an AE (Automatic Exposure) arithmetic and control circuit 15. The smear amount signal from the smear amount calculation circuit 21 is supplied to the AE arithmetic and control circuit 15. An AE control signal from the AE arithmetic and control circuit 15 is supplied to the image pick-up lens 10, the CCD 11 and the image pick-up circuit 12. The control signal from the AE arithmetic and control circuit 15 is supplied to the timing generator 17, and various timing signals are generated in the timing generator 17, and the generated timing signals are supplied to the CCD 11 and the AE arithmetic and control circuit 15.

An output signal of the image pick-up circuit 12 is supplied to an integral circuit 13, and an integral output is supplied to an AWB (Auto White Balance) arithmetic and control circuit 16. A control signal from the AWB arithmetic and control circuit 16 is supplied to the signal processing circuit 14, the integral circuit 13, and smear amount calculation circuit 21. The smear amount signal from the smear amount calculation circuit 21 is supplied to the AWB arithmetic and control circuit 16. An integral output from the integral circuit 13 is supplied to the AE arithmetic and control circuit 15, and a control signal from the AE arithmetic and control circuit 15 is supplied to the integral circuit 13. The integral circuit 13, the AE arithmetic and control circuit 16, the timing generator 17, the smear detection circuit 20 and the smear calculation circuit 21 constitute an integral arithmetic control system. In addition, the integral arithmetic control system includes an automatic focusing arithmetic and control circuit.

A picture signal from the signal processing circuit 14 is supplied to a display system 18 and the picture is displayed, and also the picture signal is supplied to a recording system to be recorded in the outside recording medium. Next, an operation of the camera apparatus of FIG. 1 when taking a picture is explained. A primary color filter (not shown) is attached in front of the CCD (imager) 11 and a light-image of a subject enters an image pick-up surface of the CCD 11 through the image pick-up lens 10 and the primary color filter. The primary color filter is an optical filter in which the filter portions of red, green and blue are arranged in mosaic shape. Instead of this primary color filter, a complementary color optical filter in which the filter portions of yellow, cyan, magenta and green are arranged in the mosaic shape may also be used.

The CCD 11 performs photo-electronic conversion on the light-image of the subject entered through the lens 10 to generate an image signal (electric-charge) and the generated image signal is output with a raster scan method. The output image signal is supplied to the image pick-up circuit 12, and after the noise is removed by the CDS circuit and the gain adjustment is performed by the AGC circuit, the signal is supplied to the A/D converter and an analogue image signal is converted into an digital image signal (image data).

A signal processing circuit 14 performs signal processing such as gamma processing, color separation processing, and YUV conversion by the ratio of 4:2:2, with respect to the image data output from the image pick-up circuit 12, and generates a picture data including intensity signal data and chroma signal data.

The picture data from the signal processing circuit 14 is supplied to the display system 18 such as LCD (Liquid Crystal Display) or the like and the picture display is performed, and also the data is supplied to the recording system 19 and is recorded in the outside recording medium such as a memory-stick.

Next, an operation of the integral arithmetic control system is explained. The digital picture signal output from the image pick-up circuit 12 of the image pick-up system is supplied to the signal processing circuit 14 of the image pick-up system and also to the integral circuit 13. The integral circuit 13 integrates the digital signals in the portion of the exposure detection area for one screen and generates a signal of an automatic exposure adjustment integral value to perform the automatic exposure (AE) adjustment corresponding to the brightness of the subject, and the generated signal is supplied to the AE arithmetic and control circuit 15. Further, the integral circuit 13 integrates the digital signals in the portion of the color information detection area of three colors of R (Red), G (Green) and B (Blue) for one screen and generates a signal of the automatic white balance control integral value to perform the automatic white balance control corresponding to the color information on the subject, and the signal is supplied to the AWB arithmetic and control circuit 16. A plurality of the above-mentioned exposure detection areas and of the color information detection areas may be provided, respectively.

The AE arithmetic and control circuit 15 controls the lens aperture value of the lens aperture means of the lens 10 and the electronic shutter speed of the electronic shutter of the CCD 11 to obtain the appropriate brightness and exposure amount when the picture recording is performed in the recording system 19, in synchronization with the timing signal from the timing generator 17. Further, the AE arithmetic and control circuit 15 controls the gain control of the AGC circuit within the image pick-up circuit 12 and the integral operation of the integral circuit 13.

The AWB arithmetic and control circuit 16 controls the gain of the R (red) signal and the gain of the B (blue) signal in the signal processing circuit 14 to obtain the appropriate white balance when the picture recording is performed in the recording system 19, in synchronization with the timing signal from the timing generator 17.

Figure 2:
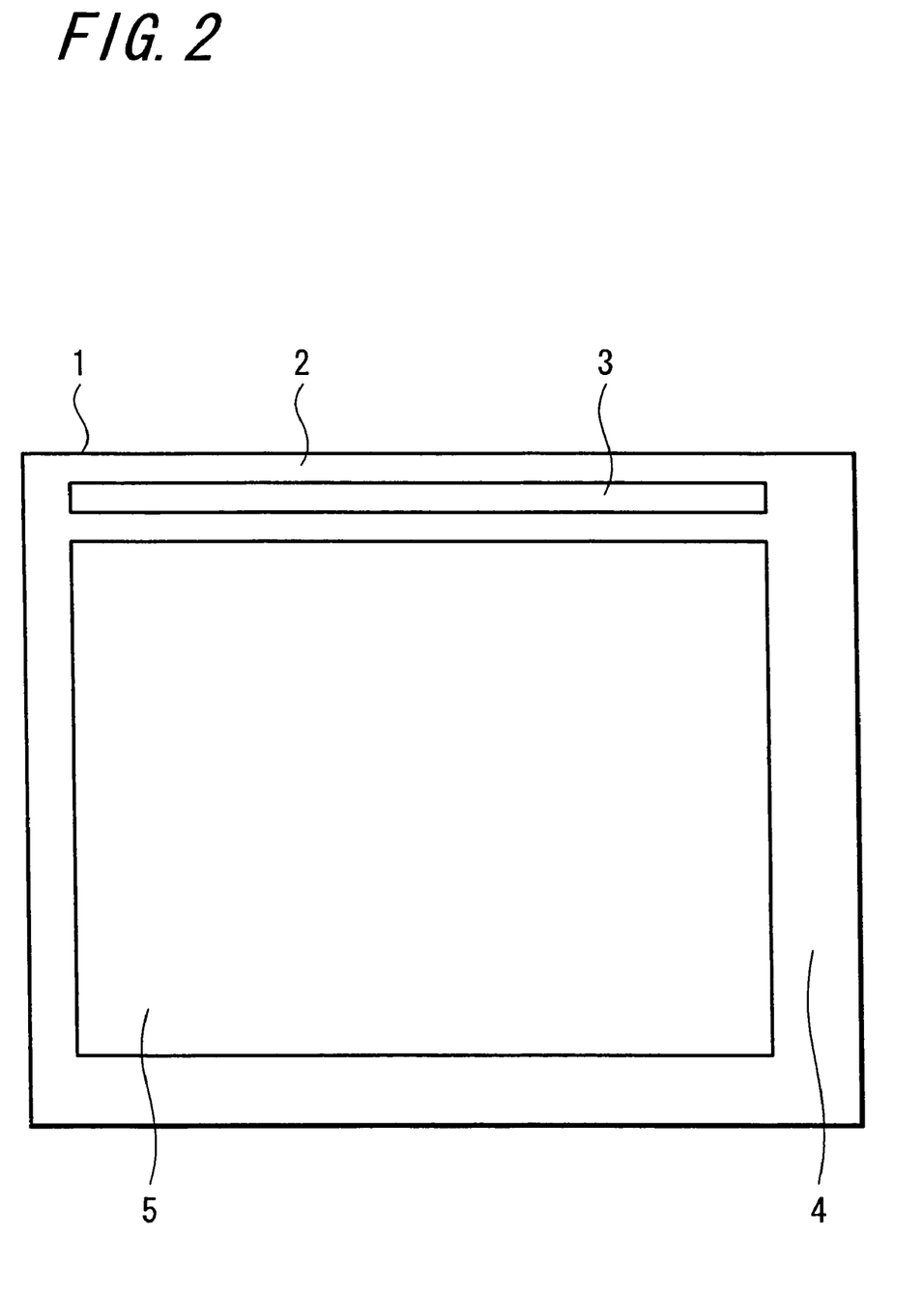
FIG. 2 is a diagram showing an example of a region of a light receiving surface of a CCD as a image pick-up means used for the digital still camera apparatus of FIG. 1.

Next, the operation of the smear detection circuit 20 is explained. Here, referring to FIG. 2, FIG. 2 shows the region of the light-receiving surface of the CCD 11 and a smear detection frame 3 is provided in the vertical OP (optical black) 2. The smear detection frame 3 is the region where the output level of the vertical OP (optical black) 2 which is the shaded pixel region outside an incident effective region 5 is detected.

Though the smear detection frame 3 is provided on the upper side of the incident effective region of the CCD 11, the frame may be provided on the lower side of the incident effective region 5. Note that numeral 4 denotes a horizontal OP.

The smear detection circuit 20 detects the smear when the signal level output to the pixel region in the smear detection frame 3 is within a predetermined threshold value, that is, when the level is higher than a first threshold level and lower than a second threshold level. In other words, it is considered that the smear has not occurred when the signal level output to the pixel region of the smear detection frame 3 is the first threshold level or lower, or the second threshold level or higher.

At the same time, when the smear is detected, the smear amount calculation mode is turned on to make the smear calculation circuit 21 in operation. When the smear is not detected, the smear amount calculation mode is turned off and the smear calculation circuit 21 is not made to operate.

Specifically, hereupon, the smear detection circuit 20 functions as judgment means to decide whether or not the calculation of the smear amount is performed. Further, the integration of the smear amount and the counting of the smear amount may be performed in the smear detection circuit 20.

The smear amount calculation in the image pick-up device system of the electronic shutter, the automatic exposure adjustment and the AGC of the digital still camera is explained in the followings. An example of the manner of calculating the smear amount by the smear amount calculation means 21 when the smear amount calculation mode is on is explained referring to the flow chart of FIG. 3. In step ST-1, the shutter speed of the electronic shutter at present, the aperture of the lens aperture, that is, the F value of the lens and R, G and B of the integral values of the red signal, the green signal and the blue signal are measured, and then the automatic exposure adjustment (AE) control is fixed. The shutter speed was ⅟500 (sec) for example, and the F value was 5.6 for example. The R, G and B of the integral values (relative values) of the red signal, the green signal and the blue signal are R=105, G=205 and B=57.5 respectively, for example.

Figure 3:
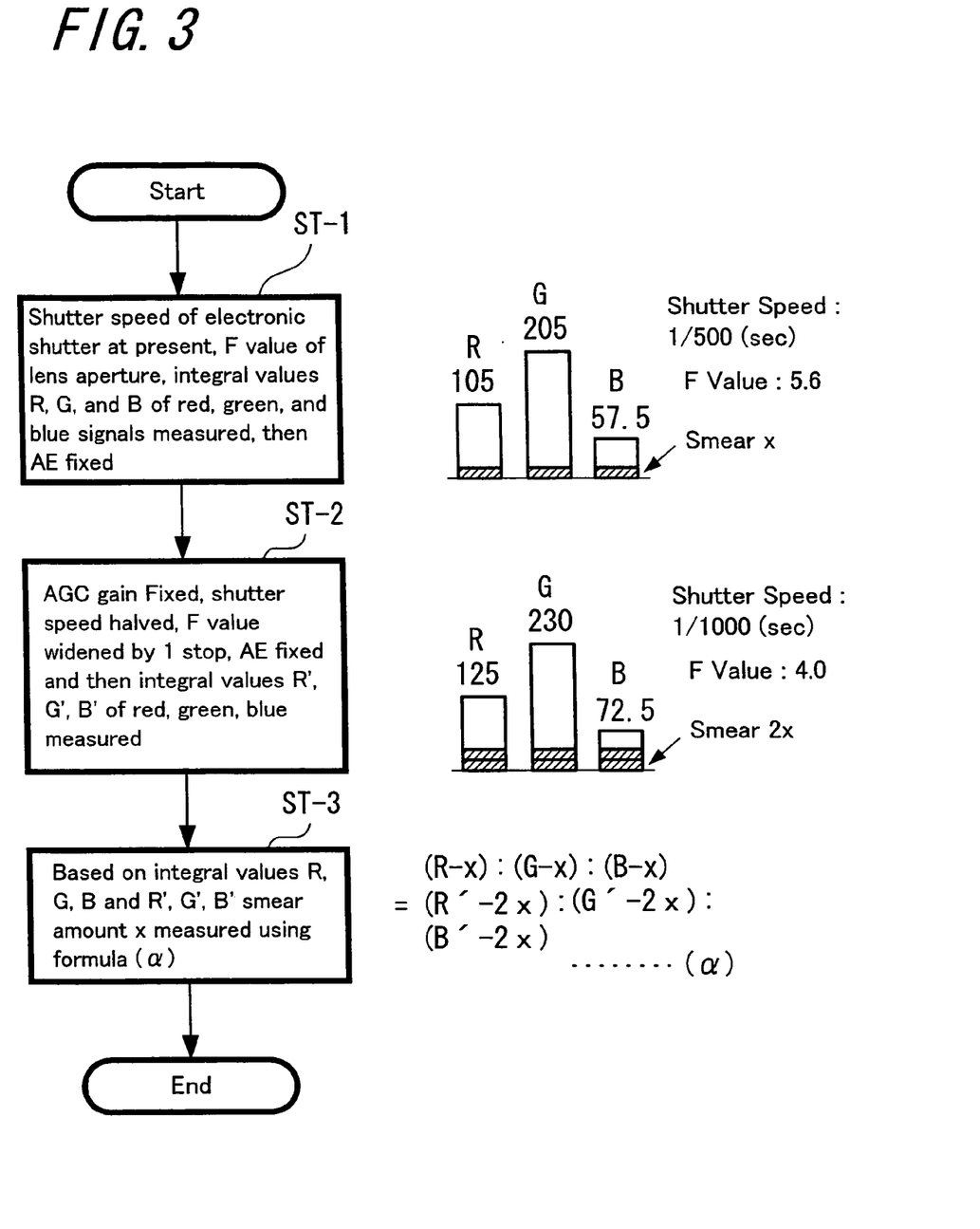
FIG. 3 is a flow chart of the smear amount calculation in the digital still camera apparatus according to the embodiment of the present invention.

In step ST-2, the AGC gain is fixed, the shutter speed of the electronic shutter is set to half the speed of the electronic shutter in the step ST-1, and the F value is widened by one stop, and the automatic exposure adjustment is fixed, and the R', G' and B' of the integral values of the red signal, the green signal and the blue signal at that time are measured. The shutter speed is ⅟1000 (sec), and the F value is 4.0. The R', G' and B' are R'=125, G'=230 and B'=72.5 respectively, for example.

The smear amount x is calculated in step ST-3 using the following equation 1 {from (α) in FIG. 3} based on R, G, B and R', G', B' of the integral values of the red signal, the green signal and the blue signal which were measured in the steps ST-1 and ST-2, respectively.

$$(R-x):(G-x):(B-x)=(R'-2x):(G'-2x):(B'-2x) \quad \text{[Equation 1]}$$

In the above, the smear amount is unchanged even if the shutter speed of electronic shutter is set to half when automatic exposure adjustment is fixed. Subsequently, when the F value is widened by one stop, the smear amount becomes twice the original value.

This is because the smear occurs in the vertical register (vertical transfer pass) within the CCD 11 and has no relation with the sensor portion and depends only on the amount of incident light that illuminates the surface of the CCD sensor determined by the lens aperture.

Even if the shutter speed of electronic shutter is set to half and the operation that the F value is widened by one stop is performed when automatic exposure adjustment control is fixed in the step ST-2, the effective signal component of the subject is the same as that in the step ST-1, so that no inconvenience occurs in photographing.

The calculation of the smear amount x in the step ST-3 is calculated from the above-mentioned equation 1 and is expressed in the next equations 2 to 4, respectively.

$$x=(R' \cdot G-R \cdot G')/(R'+2G-2R-G') \quad \text{[Equation 2]}$$

$$x=(B' \cdot G-B \cdot G')/(B'+2G-2B-G') \quad \text{[Equation 3]}$$

$$x=(R' \cdot B-R \cdot B')/(R'+2B-2R-B') \quad \text{[Equation 4]}$$

With these equations 2 to 4 of the smear amount, the smear amount can be obtained because the ratio of the integral values R, G and B in the step ST-1 and the ratio of the integral values R', G' and B' in the step ST-2 are the same while an image of the same subject is being picked up.

Next, the manner of deriving the smear amount x of the equation 2 from the equation 1 is shown in the following equation 5.

$$(R-x)/(G-x)=(R'-2x)/(G'2x)$$

$$(R-x) \cdot (G'-2x)=(R'-2x) \cdot (G-x)$$

$$R \cdot G'-2R \cdot x-G'x+2x^2=R' \cdot G-R'x-2G \cdot x+2x^2$$

$$R \cdot G'-2R \cdot x-G'x=R' \cdot G-R'x-2G \cdot x$$

$$R'x+2G \cdot x-2R \cdot x-G'x=R' \cdot G-R \cdot G'$$

$$x \cdot (R'+2G-2R-G')=R' \cdot G-R \cdot G'$$

Thus, $x=(R' \cdot G-R \cdot G')/(R'+2G-2R-G')$ [Equation 5]

Next, the manner of deriving the smear amount x of the equation 3 from the equation 1 is shown in the following equation 6.

$$(B-x)/(G-x)=(B'-2x)/(G'-2x)$$

$$(B-x) \cdot (G'-2x)=(B'-2x) \cdot (G-x)$$

$$B \cdot G'-2B \cdot x-G' \cdot x+2x^2=B' \cdot G-B' \cdot x-2G \cdot x+2x^2$$

$$B \cdot G'-2B \cdot x-G' \cdot x=B' \cdot G-B' \cdot x-2G \cdot x$$

$$B' \cdot x+2G \cdot x-2B \cdot x-G' \cdot x=B' \cdot G-B \cdot G'$$

$$x \cdot (B'+2G-2B-G')=B' \cdot G-B \cdot G'$$

Thus, $x=(B' \cdot G-B \cdot G')/(B'+2G-2B-G')$ [Equation 6]

Next, the manner of deriving the smear amount x of the equation 4 from the equation 1 is shown in the following equation 7.

$$(B-x)/(R-x)=(B'-2x)/(R'-2x)$$

$$(R-x) \cdot (B'-2x)=(R'-2x) \cdot (B-x)$$

$$R \cdot B'-2R \cdot x-B' \cdot x+2x^2=R' \cdot B-R' \cdot x-2B \cdot x+2x^2$$

$$R \cdot B'-2R \cdot x-B' \cdot x=R' \cdot B-R' \cdot x-2B \cdot x$$

$$R' \cdot x+2B \cdot x-2R \cdot x-B' \cdot x=R' \cdot B-R \cdot B'$$

$$x \cdot (R'+2B-2R-B')=R' \cdot B-R \cdot B'$$

Thus, $x=(R' \cdot B-R \cdot B')/(R'+2B-2R-B')$ [Equation 7]

The smear amount calculation circuit 21 outputs the smear amount x obtained by the above equations and the amount is sent to the AE arithmetic and control circuit 15. The AE arithmetic and control circuit 15 can perform the AE control which is not affected by the smear amount without spoiling the precision by subtracting the smear amount x from the AE integral value.

Further, the calculated smear amount x is supplied to the AWB arithmetic and control circuit 16. The AWB arithmetic and control circuit 16 can perform the AWB control which is not affected by the smear amount without spoiling the precision by subtracting the smear amount x from the AWB integral value.

In the case where the color measurement is performed in each of the multi-division areas, through detecting the smear and performing the smear amount calculation in each area, an area in which the smear has occurred can be identified. In this case, the smear detection area can be avoided to perform the AE control and the AWB control.

In the above-mentioned embodiment, the example of a digital still camera apparatus was explained; however, the present invention can be applied to a video camera apparatus which includes the digital still camera and to an information terminal which includes the digital still camera.

The present invention can be applied not only to the AE control and the AWB control but also to the AF (automatic focusing) control.

Hereinafter, the smear decreasing operation in the camera signal processing system is explained. The calculation of the smear amount is performed by the smear amount calculation means 21 when the smear amount calculation mode is on, as shown in a flow chart of FIG. 4. In step ST-11, the shutter speed of electronic shutter at present, the aperture value of the lens aperture means, namely, the F value of the lens and R, G and B of the integral values of the red signal, the green signal and the blue signal are measured, and then the automatic exposure adjustment (AE) control is fixed. The shutter speed at this time is 1/500 (sec) for example, and the F value is 5.6, for example. The R, G and B of the integral values (relative values) of the red signal, the green signal and the blue signal are R=125, G=230 and B=72.5 respectively, for example.

Figure 4:
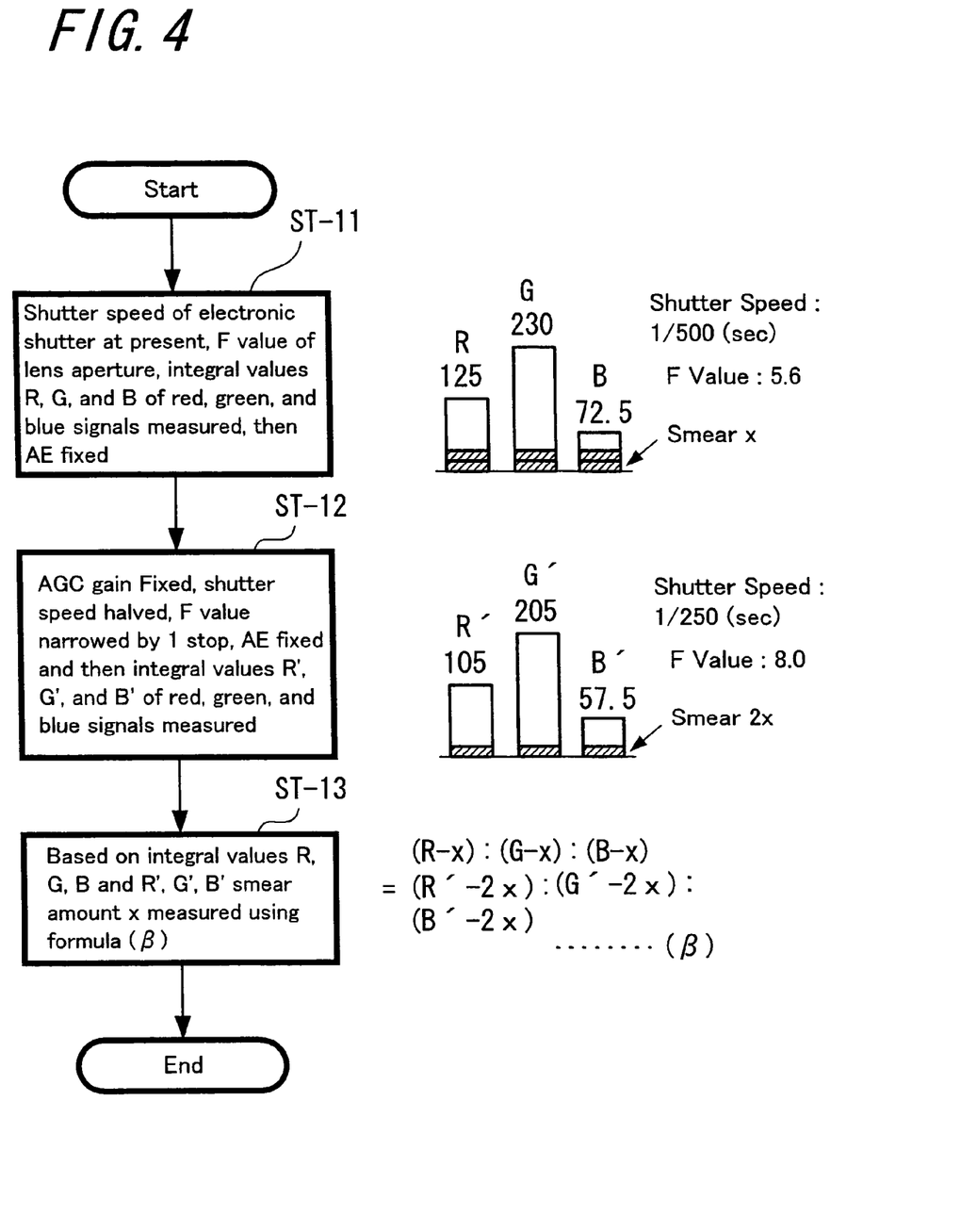
FIG. 4 is a flow chart of the smear amount calculation in the digital still camera apparatus according to the embodiment of the present invention.

In step ST-12, the AGC gain is fixed; the shutter speed of the electronic shutter is set to twice the speed in the step ST-11; the F value is narrowed by one stop; the automatic exposure adjustment is fixed; and at that time, R', G' and B' of the integral values of the red signal, the green signal and the blue signal are measured. The shutter speed at that time is 1/250 (sec), and the F value is 8.0. The R', G' and B' are R'=105, G'=205 and B'=57.5 respectively, for example.

In step ST-13, the smear amount x is calculated from the following equation 1 {from (β) in FIG. 4} based on R, G, B and R', G' and B' of the integral values of the red signal, the green signal and the blue signal which were measured in the steps ST-11 and ST-12, respectively.

$$(R-x):(G-x):(B-x)=(R'-x/2):(G'-x/2):(B'-x/2)$$ [Equation 8]

In the above, the smear amount is unchanged even if the shutter speed of electronic shutter is set to twice the speed when automatic exposure adjustment is fixed. Subsequently, when the F value is narrowed by one stop, the smear amount becomes half the original amount.

This is because the smear occurs in the vertical register (in the vertical transfer pass) inside the CCD 11 and has no relation with the sensor portion, so that the smear depends only on the amount of the incident light that illuminates the surface of the CCD sensor determined by the lens aperture.

In the step ST-12, even if shutter speed of electronic shutter is set to twice the speed and the operation of narrowing F value by one stop is performed when the automatic exposure adjustment control is fixed, no inconvenience occurs in photographing, because the effective signal component of the subject is the same as the step ST-11.

The smear amount x in the step ST-13 is calculated by the above-mentioned equation 8, and is shown in the equations 9 to 11, respectively.

$$x=(R' \cdot G-R \cdot G')/(R'+G/2-R/2-G')$$ [Equation 9]

$$x=(B' \cdot G-B \cdot G')/(B'+G/2-B/2-G')$$ [Equation 10]

$$x=(R' \cdot B-R \cdot B')/(R'+B/2-R/2-B')$$ [Equation 11]

With these equations 9 to 11 of the smear amount, the smear amount can be obtained because the ratio of the integral values R, G and B in the step ST-11 and the ratio of the integral values R', G' and B' in the step ST-12 are the same while an image of the same subject is picked up.

Then, the manner of deriving the smear amount x of the equation 9 from the equation 8 is shown in the following equation 12.

$$(R-x)/(G-x)=(R'-x/2)/(G'-x/2)$$

$$(R-x) \cdot (G'-x/2)=(R'-x/2) \cdot (G-x)$$

$$R \cdot G'-R \cdot x/2-G' \cdot x+x^2/2=R' \cdot G-R' \cdot x-G \cdot x/2+x^2/2$$

$$R \cdot G'-R \cdot x/2-G' \cdot x=R' \cdot G-R' \cdot x-G \cdot x/2$$

$$R' \cdot x+G \cdot x/2-R \cdot x/2-G' \cdot x=R' \cdot G-R \cdot G'$$

$x \cdot (R'+G/2-R/2-G')=R' \cdot G-R \cdot G'$

Thus, $x=(R' \cdot G-R \cdot G')/(R'+G/2-R/2-G')$  [Equation 12]

Next, the manner of deriving the smear amount x of the equations 10 from the equation 8 is shown in the following equation 13.

$(B-x)/(G-x)=(B'-x/2)/(G'-x/2)$ $(B-x) \cdot (G'-x/2)=(B'-x/2) \cdot (G-x)$ $B \cdot G'-B \cdot x/2-G' \cdot x+x^2/2=B' \cdot G-B' \cdot x-G \cdot x/2+x^2/2$ $B \cdot G'-B \cdot x/2-G' \cdot x=B' \cdot G-B' \cdot x-G \cdot x/2$ $B' \cdot x+G \cdot x/2-B \cdot x/2-G' \cdot x=B' \cdot G-B \cdot G'$ $x \cdot (B'+G/2-B/2-G')=B' \cdot G-B \cdot G'$ Thus, $x=(B' \cdot G-B \cdot G')/(B'+G/2-B/2-G')$  [Equation 13]

Next, the manner of deriving the smear amount x of the equations 11 from the equation 8 is shown in the following equation 14.

$(B-x)/(R-x)=(B'-x/2)/(R'-x/2)$ $(R-x) \cdot (B'-x/2)=(R'-x/2) \cdot (B-x)$ $R \cdot B'-R \cdot x/2-B' \cdot x+x^2/2=R' \cdot B-R' \cdot x-B \cdot x/2+x^2/2$ $R \cdot B'-R \cdot x/2-B' \cdot x=R' \cdot B-R' \cdot x-B \cdot x/2$ $R' \cdot x+B \cdot x/2-R \cdot x/2-B' \cdot x=R' \cdot B-R \cdot B'$ $x \cdot (R'+B/2-R/2-B')=R' \cdot B-R \cdot B'$ Thus, $x=(R' \cdot B-R \cdot B')/(R'+B/2-R/2-B')$  [Equation 14]

The smear amount calculation circuit 21 outputs the smear amount x obtained by the above equations to be sent to the AE arithmetic and control circuit 15. In the AE arithmetic and control circuit 15, the operation in which the electronic shutter speed is set to twice the speed with the same exposure amount and the lens aperture is narrowed by one stop is repeated until the smear amount x becomes small.

The conditions for repeating are shown in the followings. Until any one of the following three conditions is not satisfied:

(1) Until a smear amount becomes a predetermined amount or less (2) Until immediately before the lens aperture value causes small aperture blur, or (3) Until immediately before the shutter speed becomes slow, the above operation is performed. There might be a case in which such conditions are not required. Further, a predetermined condition can be added to the above conditions.

Hereupon, the predetermined value in the condition (1) is specified as the amount with which the smear element of the picture signal on a monitor screen becomes inconspicuous.

Further, the small aperture blur of the condition (2) indicates the blur which occurs in the picture by the diffraction phenomenon when the lens aperture is narrowed to the pin-hole condition for example, and in order to avoid such blur the lens aperture is made to be narrowed to the state immediately before the small aperture blur.

Furthermore, the ND (Neutral Density) filter which reduces the amount of light to delay the occurrence of the small aperture blur may also be used.

Moreover, with respect to the condition (3), when the electronic shutter speed is within the slow shutter range, the picture deviation tends to occur to cause the picture deterioration, so that the electronic shutter speed is made to delay until immediately before going into the slow shutter.

Accordingly, the picture quality deterioration of the camera picture signal can be restrained, because the smear elements can be reduced at a considerable rate even though the smear amount does not disappear completely.

With the above-mentioned configuration, since measures against a change of the dark electric-current and the behavior of the dark noise of vertical OP and defective pixels of vertical OP are not required, a large scale circuit is not necessary, so that the power consumption can be restrained. Further, even if the weak smear phenomenon which does not reach a saturation level occurs, a smear amount is calculated precisely and the smear components of the camera picture signal are reduced to prevent the picture quality deterioration of the camera picture signal.

According to the present invention, the digital still camera apparatus can be obtained, in which without performing measures against a change of the dark electric-current of vertical optical black, the behavior of the dark noise and defective pixels of vertical optical black, a smear amount is calculated precisely, even if a weak smear phenomenon which does not reach a saturation level occurs, to obtain the automatic exposure adjustment control and the automatic white balance control that are not affected by the smear.

Further, according to the present invention, the video camera apparatus including the digital still camera having the same effectiveness as described above can be obtained.

Further, according to the present invention, the information terminal apparatus including the digital still camera having the same effectiveness as described above can be obtained.

According to the present invention, the digital still camera apparatus can be obtained, in which without performing measures against a change of the dark electric-current of vertical optical black, the behavior of the dark noise and defective pixels of vertical optical black, a smear amount is calculated precisely, even if a weak smear phenomenon which does not reach a saturation level occurs, to obtain the automatic exposure adjustment control and the automatic white balance control that are not affected by the smear.

According to the present invention, the video camera apparatus including the digital still camera having the same effectiveness as described above can be obtained.

According to the present invention, the information terminal apparatus including the digital still camera having the same effectiveness as described above can be obtained.

According to the present invention, the digital still camera apparatus can be obtained, in which without performing measures against a change of the dark electric-current of vertical optical black, the behavior of the dark noise and defective pixels of vertical optical black, a smear amount is calculated precisely, even if a weak smear phenomenon which does not reach a saturation level occurs, to reduce the smear elements contained in the camera picture signal.

According to the present invention, the video camera apparatus including the digital still camera having the same effectiveness as described above can be obtained.

According to the present invention, the information terminal apparatus including the digital still having the same effectiveness as described above can be obtained.

According to the present invention, the digital still camera apparatus can be obtained, in which without performing measures against a change of the dark electric-current of vertical optical black, the behavior of the dark noise and defective pixels of vertical optical black, a smear amount is calculated precisely, even if the weak smear phenomenon which does not reach a saturation level occurs, to reduce the smear elements contained in the camera picture signal.

According to the present invention, the video camera apparatus including the digital still camera having the same effectiveness as described above can be obtained.

According to the present invention, the information terminal apparatus including the digital still camera having the same effectiveness as described above can be obtained.

According to the present invention, the digital still camera apparatus which can identify the area where the smear occurs can be obtained.

According to the present invention, the video camera apparatus including the digital still camera having the same effectiveness as described above can be obtained.

According to the present invention, the information terminal apparatus including the digital still camera having the same effectiveness as described above can be obtained.

The invention claimed is:

1. A digital still camera apparatus comprising:

image pick-up means;

an electronic shutter;

lens aperture means;

smear detection means which detects a smear in an image signal from said image pick-up means;

electronic shutter speed measurement and control means with respect to said electronic shutter;

lens aperture value measurement and control means with respect to said lens aperture means;

automatic exposure adjustment control means which controls said electronic shutter speed measurement and control means and said lens aperture value measurement and control means;

automatic gain control means which controls a gain of the image signal from said image pick-up means automatically;

first color information integral value measurement means which measures first color information integral values of red, green and blue respectively in a predetermined color measurement area of an effective pixel region of said image pick-up means under the condition that said automatic exposure adjustment control means is fixed, with measuring a first electronic shutter speed of said electronic shutter and a first lens aperture value of said lens aperture means by said electric shutter speed measurement and control means and said lens aperture value measurement and control means, when the smear is detected by said smear detection means;

second color information integral measurement means which measures second color information integral values of said red, green and blue respectively in said color measurement area under the condition that said automatic exposure adjustment control means is fixed, making the electronic shutter speed of said electronic shutter increase to a predetermined amount by said electronic shutter speed measurement and control means to obtain the same exposure amount as the exposure amount of said first electronic shutter speed and said first lens aperture value, so that the lens aperture of said lens aperture means is widened to that amount by said lens aperture value measurement and control means, in the condition that a gain of said automatic gain control means is fixed; and smear amount calculation means which calculates a smear amount by said first and second color information integral values of said red, green and blue from said first and second color information integral value measurement means.

2. A video camera apparatus including a digital still camera apparatus comprising:

image pick-up means;

an electronic shutter;

lens aperture means;

smear detection means which detects a smear in an image signal from said image pick-up means;

electronic shutter speed measurement and control means with respect to said electronic shutter;

lens aperture value measurement and control means with respect to said lens aperture means;

automatic exposure adjustment control means which controls said electronic shutter speed measurement and control means and said lens aperture value measurement and control means;

automatic gain control means which controls a gain of the image signal from said image pick-up means automatically;

first color information integral value measurement means which measures first color information integral value of red, green and blue respectively in a predetermined color measurement area of an effective pixel region of said image pick-up means under the condition that said automatic exposure adjustment control means is fixed, with measuring a first electronic shutter speed of said electronic shutter and a first lens aperture value of said lens aperture means by said electric shutter speed measurement and control means and said lens aperture value measurement and control means, when the smear is detected by said smear detection means;

second color information integral measurement means which measures second color information integral values of said red, green and blue respectively in said color measurement area under the condition that said automatic exposure adjustment control means is fixed, making the electronic shutter speed of said electronic shutter increase to a predetermined amount by said electronic shutter speed measurement and control means to obtain the same exposure amount as the exposure amount of said first electronic shutter speed and said first lens aperture value, so that the lens aperture of said lens aperture means is widened to that amount by said lens aperture value measurement and control means, in the condition that a gain of said automatic gain control means is fixed; and smear amount calculation means which calculates a smear amount by said first and second color information integral values of said red, green and blue from said first and second color information integral value measurement means.

3. An information terminal apparatus including a digital still camera apparatus comprising:

image pick-up means;

an electronic shutter;

lens aperture means smear detection means which detects a smear in an image signal from said image pick-up means;

electronic shutter speed measurement and control means with respect to said electronic shutter;

lens aperture value measurement and control means with respect to said lens aperture means;

automatic exposure adjustment control means which controls said electronic shutter speed measurement and control means and said lens aperture value measurement and control means;

automatic gain control means which controls a gain of the image signal from said image pick-up means automatically;

first color information integral value measurement means which measures first color information integral values of red, green and blue respectively in a predetermined color measurement area of an effective pixel region of said image pick-up means under the condition that said automatic exposure adjustment control means is fixed, with measuring a first electronic shutter speed of said electronic shutter and a first lens aperture value of said lens aperture means by said electric shutter speed measurement and control means and said lens aperture value measurement and control means, when the smear is detected by said smear detection means;

second color information integral measurement means which measures second color information integral values of said red, green and blue respectively in said color measurement area under the condition that said automatic exposure adjustment control means is fixed, making the electronic shutter speed of said electronic shutter increase to a predetermined amount by said electronic shutter speed measurement and control means to obtain the same exposure amount as the exposure amount of said first electronic shutter speed and said first lens aperture value, so that the lens aperture of said lens aperture means is widened to that amount by said lens aperture value measurement and control means, in the condition that a gain of said automatic gain control means is fixed; and smear amount calculation means which calculates a smear amount by said first and second color information integral values of said red, green and blue from said first and second color information integral value measurement means.

4. A digital still camera apparatus comprising:
image pick-up means;
an electronic shutter;
lens aperture means
smear detection means which detects a smear in an image signal from said image pick-up means;
electronic shutter speed measurement and control means with respect to said electronic shutter;
lens aperture value measurement and control means with respect to said lens aperture means;
automatic exposure adjustment control means which controls said electronic shutter speed measurement and control means and said lens aperture value measurement and control means;
automatic gain control means which controls a gain of the image signal from said image pick-up means automatically;
first color information integral value measurement means which measures first color information integral values of red, green and blue respectively in a predetermined color measurement area of an effective pixel region of said image pick-up means under the condition that said automatic exposure adjustment control means is fixed, with measuring a first electronic shutter speed of said electronic shutter and a first lens aperture value of said lens aperture means by said electric shutter speed measurement and control means and said lens aperture value measurement and control means, when the smear is detected by said smear detection means;

second color information integral measurement means which measures second color information integral values of said red, green and blue respectively in said color measurement area under the condition that said automatic exposure adjustment control means is fixed, making the electronic shutter speed of said electronic shutter decrease to a predetermined amount by said electronic shutter speed measurement and control means to obtain the same exposure amount as the exposure amount of said first electronic shutter speed and said first lens aperture value, so that the lens aperture of said lens aperture means is narrowed to that amount by said lens aperture value measurement and control means, in the condition that a gain of said automatic gain control means is fixed; and smear amount calculation means which calculates a smear amount by said first and second color information integral values of said red, green and blue from said first and second color information integral value measurement means.

5. A video camera apparatus including a digital still camera apparatus comprising:
image pick-up means;
an electronic shutter;
lens aperture means
smear detection means which detects a smear in an image signal from said image pick-up means;
electronic shutter speed measurement and control means with respect to said electronic shutter;
lens aperture value measurement and control means with respect to said lens aperture means;
automatic exposure adjustment control means which controls said electronic shutter speed measurement and control means and said lens aperture value measurement and control means;
automatic gain control means which controls a gain of the image signal from said image pick-up means automatically;
first color information integral value measurement means which measures first color information integral values of red, green and blue respectively in a predetermined color measurement area of an effective pixel region of said image pick-up means under the condition that said automatic exposure adjustment control means is fixed, with measuring a first electronic shutter speed of said electronic shutter and a first lens aperture value of said lens aperture means by said electric shutter speed measurement and control means and said lens aperture value measurement and control means, when the smear is detected by said smear detection means;

second color information integral measurement means which measures second color information integral values of said red, green and blue respectively in said color measurement area under the condition that said automatic exposure adjustment control means is fixed, making the electronic shutter speed of said electronic shutter decrease to a predetermined amount by said electronic shutter speed measurement and control means to obtain the same exposure amount as the exposure amount of said first electronic shutter speed and said first lens aperture value, so that the lens aperture of said lens aperture means is narrowed to that amount by said lens aperture value measurement and control means, in the condition that a gain of said automatic gain control means is fixed; and smear amount calculation means which calculates a smear amount by said first and second color information integral values of said red, green and blue from said first and second color information integral value measurement means.

6. An information terminal apparatus including a digital still camera apparatus comprising:
image pick-up means;
an electronic shutter;
lens aperture means
smear detection means which detects a smear in an image signal from said image pick-up means;
electronic shutter speed measurement and control means with respect to said electronic shutter;
lens aperture value measurement and control means with respect to said lens aperture means;
automatic exposure adjustment control means which controls said electronic shutter speed measurement and control means and said lens aperture value measurement and control means;
automatic gain control means which controls a gain of the image signal from said image pick-up means automatically;
first color information integral value measurement means which measures first color information integral values of red, green and blue respectively in a predetermined color measurement area of an effective pixel region of said image pick-up means under the condition that said automatic exposure adjustment control means is fixed, with measuring a first electronic shutter speed of said electronic shutter and a first lens aperture value of said lens aperture means by said electric shutter speed measurement and control means and said lens aperture value measurement and control means, when the smear is detected by said smear detection means;
second color information integral measurement means which measures second color information integral values of said red, green and blue respectively in said color measurement area under the condition that said automatic exposure adjustment control means is fixed, making the electronic shutter speed of said electronic shutter decrease to a predetermined amount by said electronic shutter speed measurement and control means to obtain the same exposure amount as the exposure amount of said first electronic shutter speed and said first lens aperture value, so that the lens aperture of said lens aperture means is narrowed to that amount by said lens aperture value measurement and control means, in the condition that a gain of said automatic gain control means is fixed; and
smear amount calculation means which calculates a smear amount by said first and second color information integral values of said red, green and blue from said first and second color information integral value measurement means.

7. The digital still camera apparatus according to claim 1, wherein
both of said measurement and control means adjust the exposure automatically by subtracting the smear amount calculated by said smear amount calculation means from the integral value in the automatic exposure adjustment condition, and adjust the white balance automatically by subtracting the smear amount calculated by said smear amount calculation means from the integral value of the amount of automatic white balance adjustment.

8. The video camera apparatus according to claim 2, wherein
both of said measurement and control means adjust the exposure automatically by subtracting the smear amount calculated by said smear amount calculation means from the integral value in the automatic exposure adjustment condition, and adjust the white balance automatically by subtracting the smear amount calculated by said smear amount calculation means from the integral value of the amount of automatic white balance adjustment.

9. The information terminal apparatus according to claim 3, wherein
both of said measurement and control means adjust the exposure automatically by subtracting the smear amount calculated by said smear amount calculation means from the integral value in the automatic exposure adjustment condition, and adjust the white balance automatically by subtracting the smear amount calculated by said smear amount calculation means from the integral value of the amount of automatic white balance adjustment.

10. The digital still camera apparatus according to claim 4, wherein
said electronic shutter speed measurement and control means makes the electronic shutter speed of said electronic shutter decrease to a fixed amount with the same exposure amount, until the smear amount calculated by said smear amount calculation means becomes small, said lens aperture value measurement and control means makes the lens aperture of said lens aperture means narrow to that amount, and those operations are repeated.

11. The video camera apparatus according to claim 5, wherein
said electronic shutter speed measurement and control means makes the electronic shutter speed of said electronic shutter slow to a fixed amount with the same exposure amount, until the smear amount calculated by said smear amount calculation means becomes small, said lens aperture value measurement and control means makes the lens aperture of said lens aperture means narrow to that amount, and those operations are repeated.

12. The information terminal apparatus according to claim 6, wherein
said electronic shutter speed measurement and control means makes the electronic shutter speed of said electronic shutter slow to a fixed amount with the same exposure amount, until the smear amount calculated by said smear amount calculation means becomes small, said lens aperture value measurement and control means makes the lens aperture of said lens aperture means narrow to that amount, and those operations are repeated.

13. The digital still camera apparatus according to claim 1, wherein
both of said measurement and control means including:
multi-division color measurement means; and
smear detection area specifying means which specifies a smear detection area where the calculation of the smear amount by said smear amount calculation means is performed in each area of the multi-division color measurement.

14. The video camera apparatus according to claim 2, wherein
   both of said measurement and control means including:
   multi-division color measurement means; and
   smear detection area specifying means which specifies a smear detection area where the calculation of the smear amount by said smear amount calculation means is performed in each area of the multi-division color measurement.

15. The digital still camera apparatus according to claim 3, wherein
   both of said measurement and control means including:
   multi-division color measurement means; and
   smear detection area specifying means which specifies a smear detection area where the calculation of the smear amount by said smear amount calculation means is performed in each area of the multi-division color measurement.

* * * * *